United States Patent
Suri et al.

(10) Patent No.: US 11,258,968 B2
(45) Date of Patent: Feb. 22, 2022

(54) IMAGE SENSOR

(71) Applicant: Indian Institute of Technology Delhi, New Delhi (IN)

(72) Inventors: Manan Suri, New Delhi (IN); Mukul Sarkar, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 460 days.

(21) Appl. No.: 16/461,332

(22) PCT Filed: Dec. 28, 2016

(86) PCT No.: PCT/IN2016/050460
§ 371 (c)(1),
(2) Date: May 15, 2019

(87) PCT Pub. No.: WO2018/092148
PCT Pub. Date: May 24, 2018

(65) Prior Publication Data
US 2021/0281781 A1 Sep. 9, 2021

(30) Foreign Application Priority Data
Nov. 15, 2016 (IN) .............................. 201611038992

(51) Int. Cl.
*H04N 5/355* (2011.01)
*H04N 5/369* (2011.01)

(52) U.S. Cl.
CPC ....... *H04N 5/3559* (2013.01); *H04N 5/35518* (2013.01); *H04N 5/3696* (2013.01)

(58) Field of Classification Search
CPC . H04N 5/3559; H04N 5/35518; H04N 5/3696
See application file for complete search history.

(56) References Cited

U.S. PATENT DOCUMENTS

| 2006/0181627 | A1 | 8/2006 | Farrier |
| 2011/0309236 | A1 | 12/2011 | Tian et al. |
| 2015/0155334 | A1* | 6/2015 | Lu ....................... H01L 29/7869 257/4 |

FOREIGN PATENT DOCUMENTS

| CN | 1977337 A | 6/2007 |
| WO | WO-2018092148 A1 | 5/2018 |

OTHER PUBLICATIONS

"International Application No. PCT/IN2016/050460, International Search Report and Written Opinion dated Mar. 22, 2017", (Mar. 22, 2017), 9 pgs.

* cited by examiner

*Primary Examiner* — Twyler L Haskins
*Assistant Examiner* — Angel L Garces-Rivera
(74) *Attorney, Agent, or Firm* — Schwegman Lundberg & Woessner, P.A.

(57) ABSTRACT

Examples of image sensors are described herein. In an example, an image sensor may comprise an array of hybrid pixels, where each hybrid pixel includes light sensing unit and a non-volatile memory component coupled to the light sensing unit. The light sensing unit comprises a light detecting element and a charge to voltage conversion unit. The charge to voltage conversion unit is to provide an output pixel signal ($V_{PD}$), based on photo-electrons generated by the light detecting element. Further, the non-volatile component when calibrated to an initial resistance state is to compress the output pixel signal ($V_{PD}$) during exposure.

12 Claims, 9 Drawing Sheets

IMAGE SENSOR

PRIORITY CLAIM TO RELATED APPLICATIONS

This application is a U.S. national stage filing under 35 U.S.C. § 371 from International Application No. PCT/IN2016/050460, filed on 28 Dec. 2016, and published as WO2018/092148 on 24 May 2018, which claims the benefit under 35 U.S.C. 119 to India Application No. 201611038992, filed on 15 Nov. 2016, the benefit of priority of each of which is claimed herein, and which applications and publication are hereby incorporated herein by reference in their entirety.

TECHNICAL FIELD

The present subject matter relates, in general, to imaging technology, in particular, image sensors for processing images.

BACKGROUND

With the advent of semi-conductor and imaging technology, image sensors, have become ubiquitous. Image sensors are used in a variety of devices, such as digital cameras, computing devices, scanners, and medical diagnostic equipment. Generally, the image sensors detect light waves and provide for conversion of these light ways into electrical signals to recreate a scene. The image sensors may be, for instance, complementary metal oxide semiconductor (CMOS) image sensors or charge coupled devices (CCDs).

Until recently, imaging systems implemented the CCDs, which offered better image quality but weren't considered cost-effective. CMOS image sensors, on the other hand, enabled single-chip design of the imaging system and also provided a cost-effective alternative. However, CMOS image sensors may suffer from low dynamic range (DR), when exposed to low light or bright light conditions, thereby affecting the image quality.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of the system(s) in accordance with the present subject matter are described, by way of examples only, and with reference to the accompanying figures, in which.

DETAILED DESCRIPTION

Figure 1A:
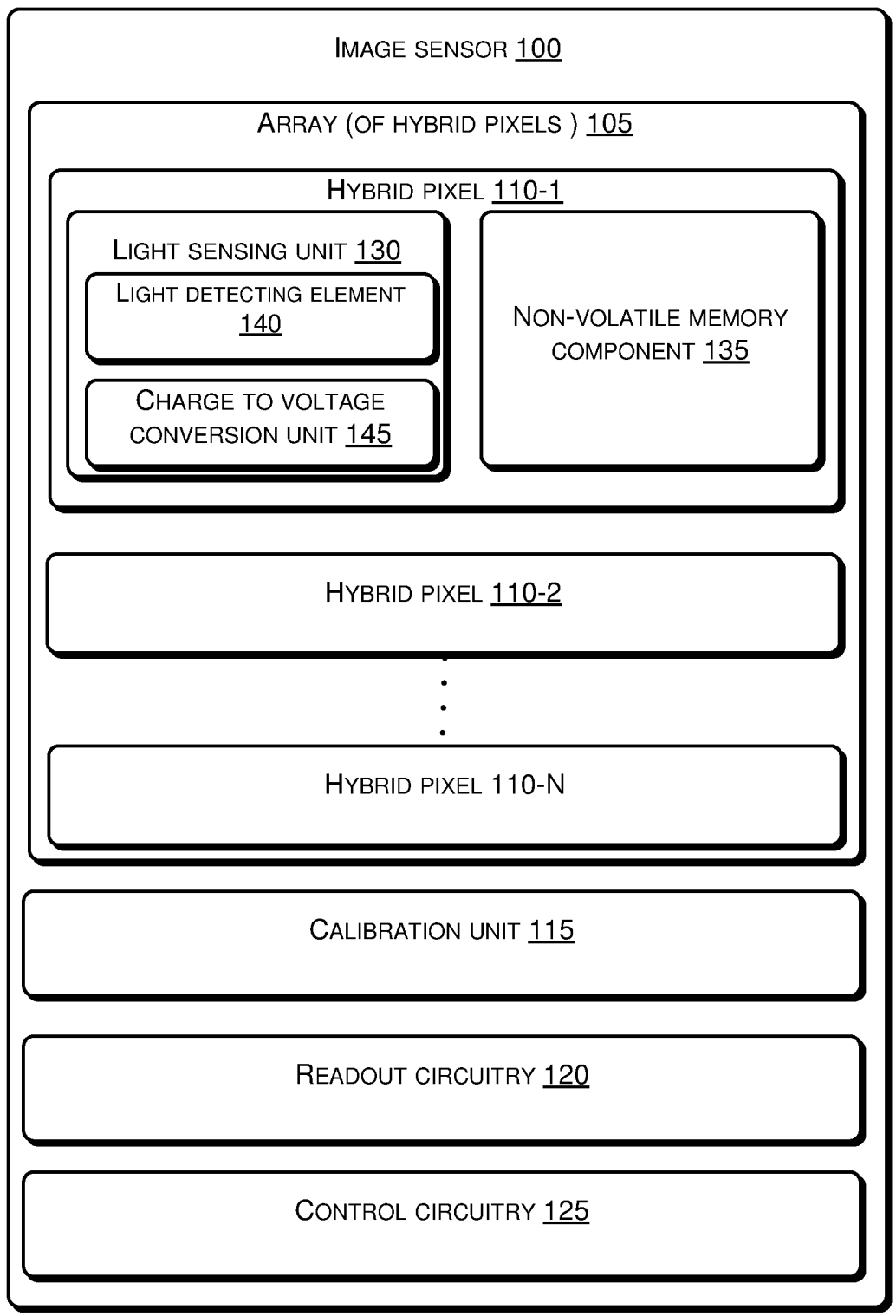
FIG. 1a illustrates a block diagram representation of an imaging system, in accordance with an embodiment of the present subject matter.

Image sensors provide for conversion of light waves as they pass through and/or as they are reflected by objects into corresponding electrical signals to provide for generation of an image. The image sensors generally include an array of pixels or photo-sites, which include photodiodes to generate photo-electrons, which are subsequently converted to electric signals. The image sensors may include charge coupled devices or complementary metal oxide semiconductor (CMOS) for capturing light and converting it into electrical signals.

Complementary metal oxide semiconductor (CMOS) image sensors are widely used in modern imaging systems owing to their smaller size, easy integration with other semiconductor components, and low power requirements. However, the CMOS image sensors may have certain limitations, such as low dynamic range, which may affect quality of output images. High dynamic range (HDR) is one of the critical characteristics affecting performance of the imaging system. Dynamic range may be defined as a ratio of maximum and minimum detectable exposure by a pixel of an image sensor. Maximum detectable exposure is mainly limited by noise, whereas minimum detectable exposure is limited by low sensitivity of a photodiode. Dynamic range may be enhanced either by reducing noise or by managing the sensitivity of the photodiode. For instance, to enhance the dynamic range additional correctional circuits may be implemented, size of a pixel may have to be increased, or additional transistors or capacitors may be required. However, this may result in an increase in silicon area, increased power dissipation, complex circuitry, and finally additional costs. Consequently, defeating the purpose of using CMOS image sensors in the imaging systems.

Aspects of the present subject matter relate to an imaging system having an image sensor, such as a CMOS image sensor to provide high dynamic range. In an example, the image sensor may include an array of hybrid pixel-non-volatile memory circuits. Each hybrid pixel-non-volatile memory circuit, hereinafter referred to as a hybrid pixel, is configured to detect light waves and generate corresponding electrical signals.

A hybrid pixel may include a light detecting element, such as a photodiode, a charge to voltage conversion unit, and a non-volatile memory component. The light detecting element, such as a photo-diode, may generate photo-electrons, and a charge to voltage conversion unit may provide an electric signal, referred to as output pixel signal, corresponding to the generated photo-electrons. The non-volatile memory component may be coupled to the charge to voltage conversion unit.

In an example, the non-volatile memory component may be calibrated, i.e., prior to exposure, during exposure, or post-exposure to a resistance state, based on intensity of incident light or input light. For instance, the resistance state may be high resistance state, such as RESET state and partial resistance state, or a low resistance state, such as SET state and partial SET state. Thus, the SET state and partial SET state may correspond to low electrical-resistivity or high electrical conductivity of the non-volatile memory component. Likewise, the RESET state and the partial RESET state may correspond to high electrical-resistivity or low electrical conductivity of the non-volatile memory component. It will be appreciated that a value of resistance/conductivity corresponding to the various resistance state may be configured, based on type of the NVM device, type of image sensor, and user preferences.

The resistance state may be selected, for instance, based on an intensity of the input light and/or a predefined manner of evolution of the output pixel signal ($V_{PD}$). Further, the resistance state may be calibrated by applying a suitable voltage/current across the terminals of the non-volatile memory components.

Upon calibrating the non-volatile memory component, the output pixel signal ($V_{PD}$) may be provided across one of the terminals of the non-volatile memory component. The output pixel signal ($V_{PD}$) provides for modulation of the resistance of the non-volatile memory component. The modulation of the resistance, in turn, leads to a varying effective capacitance of the light detecting element. Further, based on the resistance state of the NVM component and the varying effective capacitance of the light detecting element, the output pixel signal ($V_{PD}$) may be compressed during exposure, when applied to the non-volatile memory device.

The output pixel signal (VPD) may be compressed, for instance, logarithmically (exponentially) or linearly. A compressed output pixel signal may attain a shorter range of values as compared to an uncompressed VPD signal. As a result, the same amount of light intensity or exposure stimulus on the pixel may now take up less resources since the translated signal is compressed. Further, the same information may be conveyed using less resources, thereby making it easy to handle and post processing.

Moreover, it may also provide for increasing storage density as compressed signal will take up less space compared to an uncompressed one. Further, the modulation of the effective capacitance of the light detecting element, by the output pixel signal ($V_{PD}$) evolution and the NVM resistance modulation, enhances the sensitivity of the pixel. Also, as dynamic range is determined by full well capacity of a light detecting element of a pixel, the present non-volatile memory component provides for varying the effective full well capacity, based on specific NVM resistance modulation, thereby providing high dynamic range.

Consequently, image sensors with higher dynamic range may be achieved without substantially increasing the silicon area, thereby making present image sensor cost effective. The silicon area penalty for adding NVM device is almost negligible as the NVM device can be easily integrated between two metal levels in a via, without sacrificing any front-end silicon space. Further, the hybrid pixels of the present subject matter are easy to implement without requiring complex circuitry.

These and other advantages of the present subject matter would be described in greater detail in conjunction with the following figures. While aspects of the described aspects of image sensors can be implemented in any number of different configurations, the embodiments are described in the context of the following system(s).

These and other advantages of the present subject matter would be described in a greater detail in conjunction with the FIGS. 1-7 in the following description. The manner in which the image sensors is implemented and operated shall be explained in details with respect to the FIGS. 1-7.

It should be noted that the description merely illustrates the principles of the present subject matter. It will thus be appreciated that those skilled in the art will be able to devise various arrangements that, although not explicitly described herein, embody the principles of the present subject matter and are included within its scope. Furthermore, all examples recited herein are intended only to aid the reader in understanding the principles of the present subject matter. Moreover, all statements herein reciting principles, aspects and embodiments of the present subject matter, as well as specific examples thereof, are intended to encompass equivalents thereof.

Figure 1B:
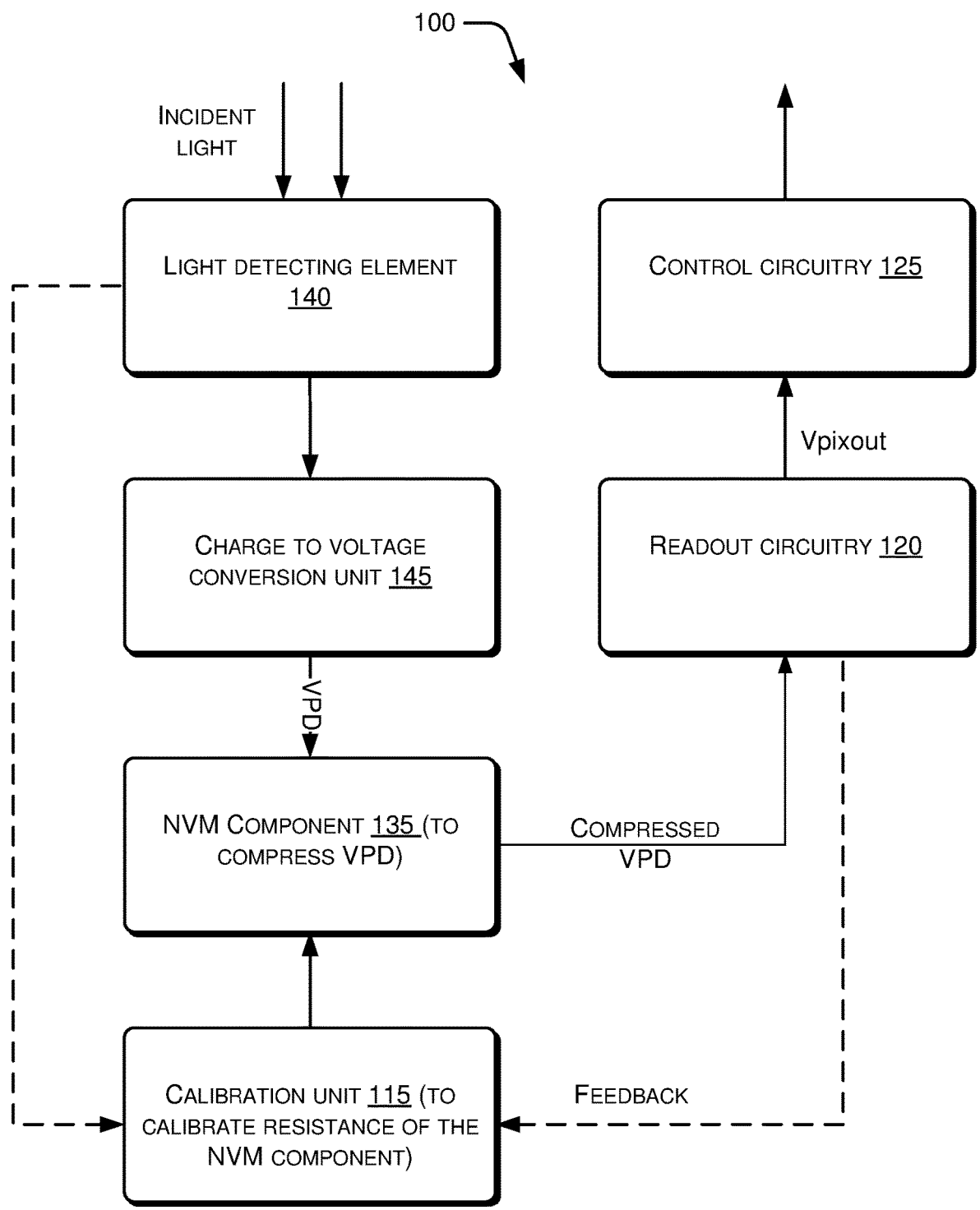
FIG. 1b illustrates a schematic of the imaging system, in accordance with an embodiment of the present subject matter.

FIG. 1*a* illustrates a block diagram representation of an image sensor 100, and FIG. 1*b* illustrates a schematic of the image sensor 100, in accordance with an embodiment of the present subject matter. The image sensor 100 may be implemented in an imaging system, such as digital cameras, camcorders, astronomical cameras, medical equipment, and machine vision devices. The image sensor 100 provides for capturing and processing of images. The image sensor 100 may be fabricated as a single integrated chip or may be fabricated as two or more integrated chips having suitable interconnections.

The image sensor 100, among other things, may include an array 105 of hybrid pixels 110-1, 110-2, ... 110-N, a calibration unit 115, a readout circuitry 120, and a control circuitry 125. The calibration unit 115 and the control circuitry 125 may be provided as two separated units or may be integrated to form a single calibration unit 115.

The array 105 may include multiple hybrid pixels 110-1, 110-2, ... 110-N. The hybrid pixels 110-1, 110-2, ... 110-N may be collectively referred to as hybrid pixel(s) 110. Further, for the sake of brevity, the components of only one of the hybrid pixels 110 are illustrated, it will be appreciated that the other hybrid pixels 110 may include similar components. The array 105 may be, for instance, a 2D array, with hybrid pixels 110 arranged in rows and columns of the array 105. In an example, each hybrid pixel 110 may be a CMOS device. Further, each hybrid pixel 110 may include a light sensing unit 130 coupled to a non-volatile memory (NVM) component 135. The light sensing unit 130 may in turn include a light detecting element 140 and a charge to voltage conversion unit 145, also referred to as Q-V unit. The light detecting element 140 may be such that it's conductivity corresponds to the intensity of light impinging on the light detecting element 140. The light detecting element 140 may be, for instance, a photodiode, a phototransistor, or any other suitable device for detecting light. The charge to voltage conversion unit 145 may be coupled to the light detecting element 140 to provide an electric signal to recreate the optical scene.

According to an aspect of the present subject matter, each hybrid pixel 110 may also include the NVM component 135.

The NVM component 135 may be coupled to the voltage conversion unit to, for instance, enhance the dynamic range of the image sensor 100. The NVM component 135 may be disposed between two metal levels in a via, i.e., an electrical connection between two metal layers. In an example, the NVM component 135 may be integrated in the hybrid pixel 110 in one selector-one resistor configuration (1T/1D-1R).

Examples of the NVM component 135 resistive NVM devices and magneto-resistive NVM devices. The resistive NVM device include, for example, resistive random access memory (ReRAM), oxide-based ReRAM (OxRAM), conductive bridging RAM (CBRAM), phase change memory (PCM), programmable metallization cell (PMC), memristor, organic, carbon nanotube (CNT) memory. Further, examples of magneto-resistive NVM devices include spin transfer torque-magnetic random-access memory (STT-MRAM), magneto resistive random access memory (MRAM), and magnetic tunnel junction (MTJ) memory device.

The calibration unit 115 may, for instance, have data storage and data processing capability. Further, the calibration unit 115 may be adapted to receive external input to accordingly operate the non-volatile memory component 135. The readout circuitry 120 and the control circuitry 125 may be implemented as known in the art.

In operation, the light detecting element 140 of each hybrid pixel 110 may detect light incident on the image sensor 100 and generate photo-electrons, based on intensity of the incident light. The photo-electrons may be converted into a corresponding output pixel signal by the charge to voltage conversion unit 145. The charge to voltage conversion unit 145, based on a light induced charge (photo-electrons) generated by the light detecting element 140 may generate a corresponding electric signal, i.e., output pixel signal ($V_{PD}$).

The NVM component 135 is coupled to the light sensing unit 130 such that voltage, $V_{PD}$, appears as an effective voltage across two terminals of the NVM component 135. According to an aspect of the present subject matter, the NVM component 135 may be set to a resistance state. The calibration may be performed prior to exposure or during exposure (in-exposure) of image sensor 100. Moreover, the calibration may be automated and may be performed by, for instance, the calibration unit 115. Alternatively, the calibration may be performed manually as well. Further, in other examples, the NVM component 135 may be set to a default resistance state, hence no calibration may be required in such a case. Thus, in cases, where calibration is not to be performed, the calibration unit 115 may not be included in the image sensor 100. In certain other examples, the calibration unit 115 may decouple the NVM component 135 from the light sensing unit 130, i.e., the NVM component 135 may be deactivated, in case a user wishes to use the image sensor in a usual manner.

Referring to a case, where calibration is to be performed, the calibration may be performed pre-exposure state or an in-exposure state. The pre-exposure state corresponds to a case, where the calibration is performed prior to an exposure cycle. Such calibration may be based on default settings or based on a feedback received for a pervious cycle from the readout circuitry. The in-exposure state calibration refers to a case, where calibration may be formed during the exposure cycle. Again, such a calibration may also be based on default settings and/or feedback received.

The calibration of resistance using the default settings may comprise selection of the resistance state such that photo-diode voltage $V_{PD}$ of the output pixel signal is compressed. Therefore, the output pixel signal may also be provided to the calibration unit 115. In an example, the resistance is set such that the $V_{PD}$ evolution or the evolution (or compression) of the output pixel signal through the NVM component 135 is either linear or logarithmic during exposure. This ensures that the fall or evolution of the output pixel signal ($V_{PD}$) is such that the output pixel signal does not end up in noise window too soon or the output pixel signal doesn't get saturated. Such logarithmic and linear compression also helps in enhancing dynamic range.

The calibration may be based on intensity of incident light and/or a predefined manner of evolution of the output pixel signal ($V_{PD}$) during exposure. For instance, in a case where a user wishes to overcome only light intensity related issues, the resistance may be based on the intensity of light only, whereas in cases, where the user wishes to compress the output pixel signal desired results, the predefined manner, i.e., logarithmic (exponential) or linear, may also be selected. In few other examples, the feedback from the readout circuitry may also be used to further calibrate/fine tune resistance of the non-volatile memory component 135.

In one example, the calibration unit 115 may determine intensity of the incident light or exposure level, based on generated photo-electrons. Alternatively, a separate light detection element may be integrated with the calibration unit 115. In an example, resistance values for various exposure levels may be encoded for further processing.

Further, it may be ascertained, whether detected light intensity is within a predefined exposure range. The predefined exposure range may be already defined by a user or may have default values. The predefined exposure range may correspond to optimum exposure levels, where an exposure level below threshold minimum may indicate underexposure, while an exposure level beyond threshold maximum may indicate overexposure. As will be appreciated, image quality may be comprised in cases of overexposure and underexposure in case of conventional image sensors 100. Therefore, to enhance quality of images in such cases, the dynamic range of the image sensor 100 is enhanced by the NVM component 135 of the present subject matter.

When it is ascertained that the detected light intensity, is within the predefined range, no calibration may be performed. However, in case of sub-optimal exposure levels (over/under exposure), the calibration may be performed. In case ambient conditions correspond to overexposure, i.e., the light intensity being greater than a maximum threshold, the calibration unit 115 may calibrate the NVM component 135 to a low resistance state, such as SET state or partial-SET state. Likewise, in case of underexposure, the calibration unit 115 may calibrate the resistance to the NVM component 135 to a high resistance state, such as a RESET state or partial-RESET state.

In case OxRAM is used as the NVM component and the ambient light conditions indicate over-exposure, calibrating the OxRAM to low resistance would allow the additional current to pass through the NVM component so that the final $V_{PD}$ can come back in detectable range. Similarly, during underexposure, calibrating the resistance of OxRAM to high resistance state would restrict the flow of current due to $V_{PD}$ to save the final $V_{PD}$ level from slipping out of the detectable range. It will be appreciated that the strategy described for calibrating of resistance state of OxRAM is for example purpose only, and an alternate strategy can be used for other NVM components.

Further, the SET state (hard SET) or partial SET state (soft SET) may be selected, based on type of NVM component. For instance, if OxRAM is used SET state may be used, while PCM or RRAM is used, the resistance state may correspond to partial reset state. Also, the values of each of these states may configurable. The same principles may extend to for selection between RESET state (hard RESET) and partial-RESET state (soft RESET). Moreover, in certain cases, only one of the two kinds of SET state and RESET state may be there. For example, an NVM component may have either SET state or a partial SET state.

It will be appreciated that a value of the resistance of the non-volatile memory component 135 may be based on a material of the non-volatile memory component 135. Therefore, based on the non-volatile memory component 135 implemented in the image sensor 100, corresponding values of various resistance states may be stored in the calibration unit 135. Further, the calibration unit 115 may also store the current voltage characteristic curve of the non-volatile memory component 135 to aid in selection of the manner of compression of the output pixel signal ($V_{PD}$). Further, the values of resistance for SET and RESET states, information pertaining to current-voltage characteristics, and predefined intensity range may be stored in the calibration unit 115.

Also, a value of the resistance is selected or further tuned, based on a predefined manner (logarithmic or linear) of the evolution of the output pixel signal ($V_{PD}$) and/or feedback from the read-out circuitry 120.

The resistance corresponding the resistance state may be determined using a current-voltage (I-V) characteristic curve of the NVM component 135. In other words, using the current-voltage (I-V) characteristic curve, voltage or current required to set the resistance of the NVM component 135 to the determined resistance may be determined. Accordingly, determined voltage or current may be applied across the NVM component 135.

The application of determined voltage or current for calibrating the resistance may be realized, for instance, by direct application of a voltage or current value at the $V_{PD}$ node, or by the application of an effective voltage drop across the two terminals of the NVM device by addition of a separate programming/calibration block, such as calibration unit 115 to the image sensor 100.

The calibration of the NVM component 135 in different resistance states provides for modulation of the resistance of the NVM component 135 in a desired or specified way, prior or during exposure at the hybrid pixel 110. For certain resistance states the output pixel signal ($V_{PD}$) may evolve in a certain way and for certain others, the output pixel signal ($V_{PD}$) may evolve in a different way. For instance, when an OxRAM is used as the NVM component 135, the output pixel signal ($V_{PD}$) may modify conductive filament of the OxRAM and subsequently the resistance. This way, the evolution of the output pixel signal ($V_{PD}$) may be controlled during exposure, which in turn may provide for controlling dynamic range and signal compression.

In one example, the output from the NVM component 135, referred to as compressed output pixel signal, may be provided to the read-out circuitry coupled to the array 105. The readout circuitry 120 may readout a rows of the array 105 at a time along readout column lines, such as a column readout, a serial readout, or a full parallel readout of all pixels simultaneously to provide pixel output, $V_{pixout}$. The pixel output may be computed using following equation(s):

$$V_{pixout} = VPD_{reset} - \frac{I_{total} \times T_{exp}}{C_{PPD}} \quad (1)$$

$$I_{total} = I_{exp} + I_{OxRAM} \quad (2)$$

$$I_{OxRAM} = I_{CF} + I_{Oxide} \quad (3)$$

$$I_{CF} \propto \exp - aL \times \sinh(b \times VPD) \quad (4)$$

$$I_{Oxide} \propto \exp - c \times x (\sinh d \times V_{gap}) \quad (5)$$

where, $I_{CF}$ is current through filament, $I_{oxide}$ is current through oxide (hopping+tunneling current); a, b, c, and d are constants; and $V_{gap}$ is voltage drop across filament gap.

Further, the operation of the array 105, the calibration unit 115, and the readout circuitry 120 may be controlled by the control circuitry 125. The control circuitry 125 may implement correlated double sampling for noise removal and filtering of pixel output, $V_{pixout}$. The control circuitry 125 and the readout circuitry 120 may be implement as known in the art.

Figure 2A:
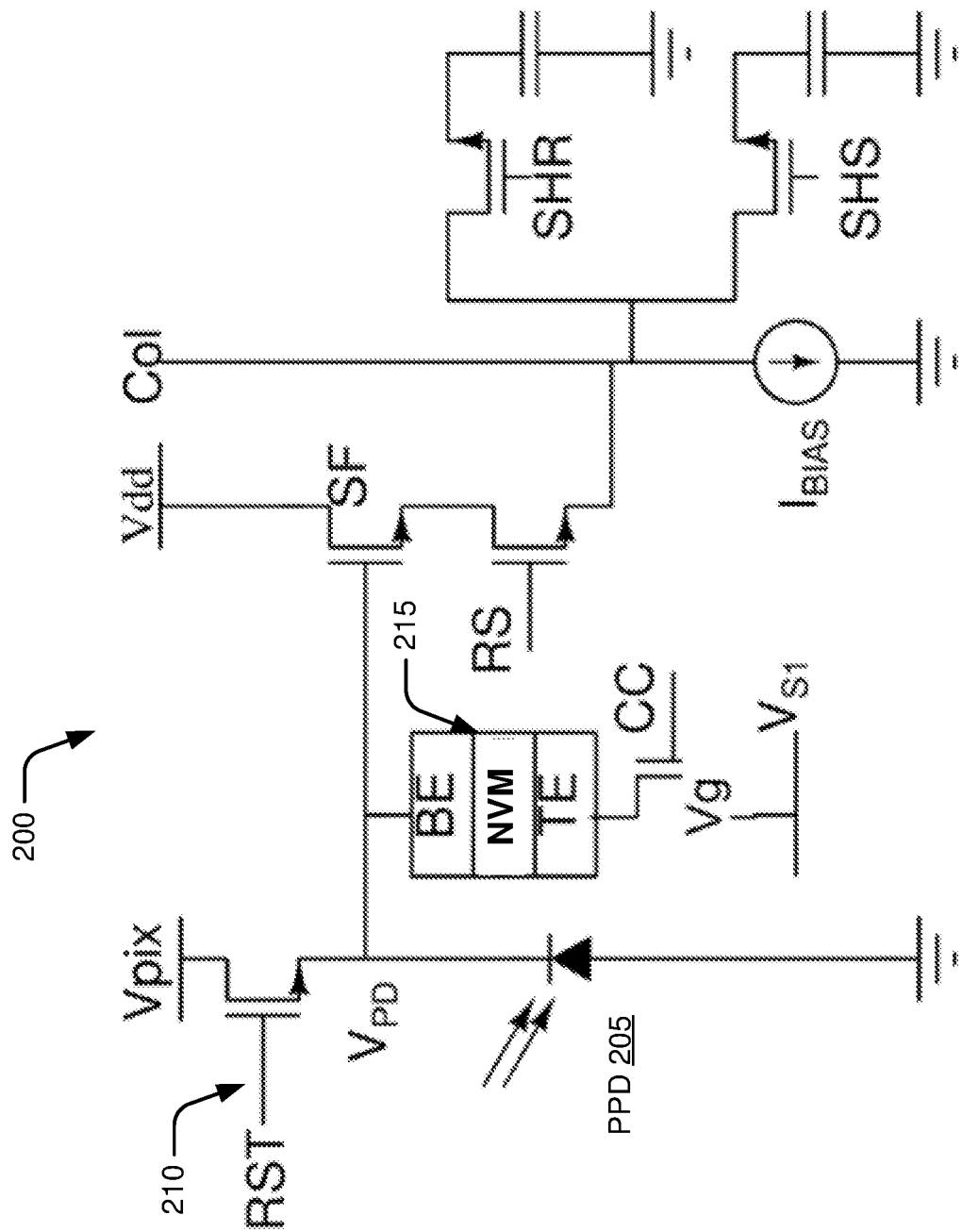
FIG. 2a illustrates an example circuit diagram of a pixel of an image sensor.
Figure 2C:
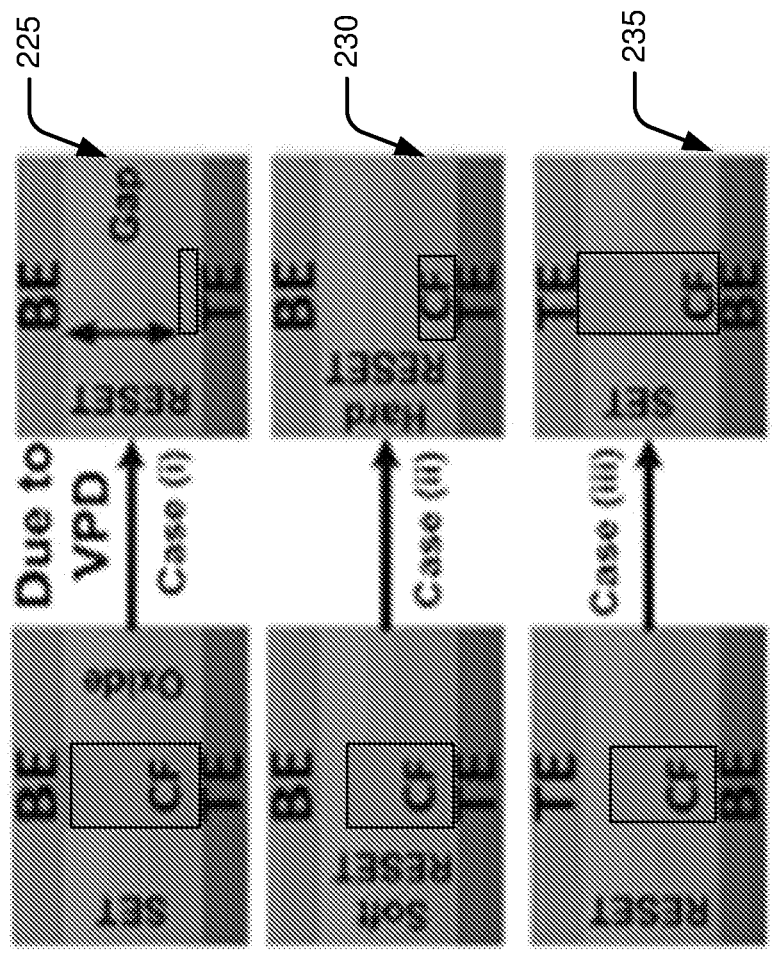
FIG. 2c illustrates a conceptual diagram illustrating different possible NVM device resistance switching/modulation events, in accordance with an embodiment of the present subject matter.
Figure 2B:
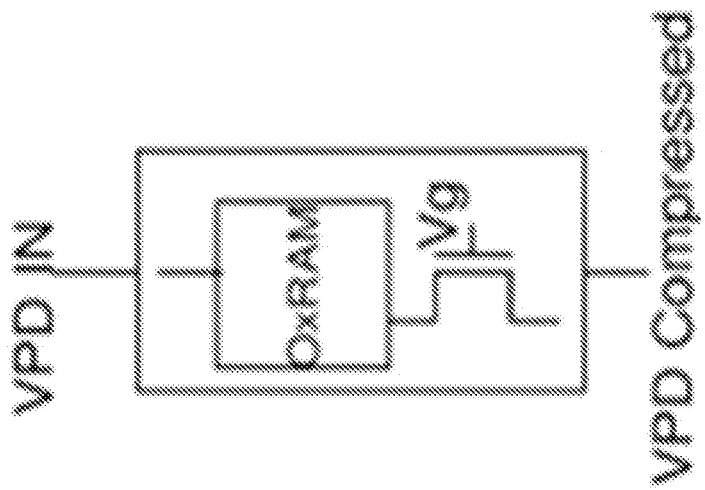
FIG. 2b illustrates an NVM component with a transistor connected to $V_{PD}$ terminal.

FIG. 2a illustrates an example circuit diagram 200 of a hybrid pixel of the image sensor 100, and FIGS. 2b and 2c illustrate a conceptual diagram illustrating impact of $V_{PD}$ modulation, in accordance with an embodiment of the present subject matter. Although FIG. 2a illustrates a 4T pixel architecture, it should be appreciated that embodiments of the invention are equally applicable to 3T, NT, and various other pixel architectures. Further, in the present embodiment, the image sensor 100 is a CMOS device and OxRAM is implemented as the NVM component 135. As can be seen, the incident light is detected by the light detecting element, pinned photo-diode (PPD) 205, and converted to output pixel signal ($V_{PD}$) by the charge to voltage conversion unit 210. The output pixel signal ($V_{PD}$) is then compressed by the NVM component 215. The output pixel signal ($V_{PD}$) is directly applied either to the top electrode (TE) or bottom electrode (BE). Further, compressed output pixel signal is then provided to subsequent circuitry for further processing as known in the art.

In said example, the OxRAM device was calibrated to a specific initial resistance level (Set or Reset or partial Set/Reset). Further, the OxRAM initial resistance was chosen such that; the output pixel signal ($V_{PD}$) is either linearly or logarithmically compressed during the exposure. During and pre-exposure, VPD signal modulates the resistance, and the conductive filament (CF) of the OxRAM device, as can be observed from FIG. 2c. For instance, referring to case (i) marked as 225, on setting the initial resistance to SET state, the conductive filament may reduce on application of the output pixel signal ($V_{PD}$) and the final resistance (or CF) may correspond to RESET state. Likewise, in case marked as 230, when OxRAM is set to soft RESET (partial reset), on $V_{PD}$ application, the final resistance may correspond to hard RESET. Further, in case marked as 235, the resistance of OxRAM may correspond to SET state, when the initial resistance is set to RESET state. The dynamic range of convention CMOS image sensors is generally in the range of about 50-60 dB. The example image sensor using OxRAM enhances the dynamic range of a conventional pixel (i.e. without NVM component) having DR in the range of about 50-60 dB to around 80-100 dB without substantially adding on to silicon footprint, complexity, or costs. Thus, the present subject matter provides for enhancing the dynamic range of an already available pixel. For instance, in case the conventional pixel has the DR of about 100 dB, on application of the present subject matter, the DR may be enhanced to 120 dB or more, based on type of NVM component.

Figure 3:
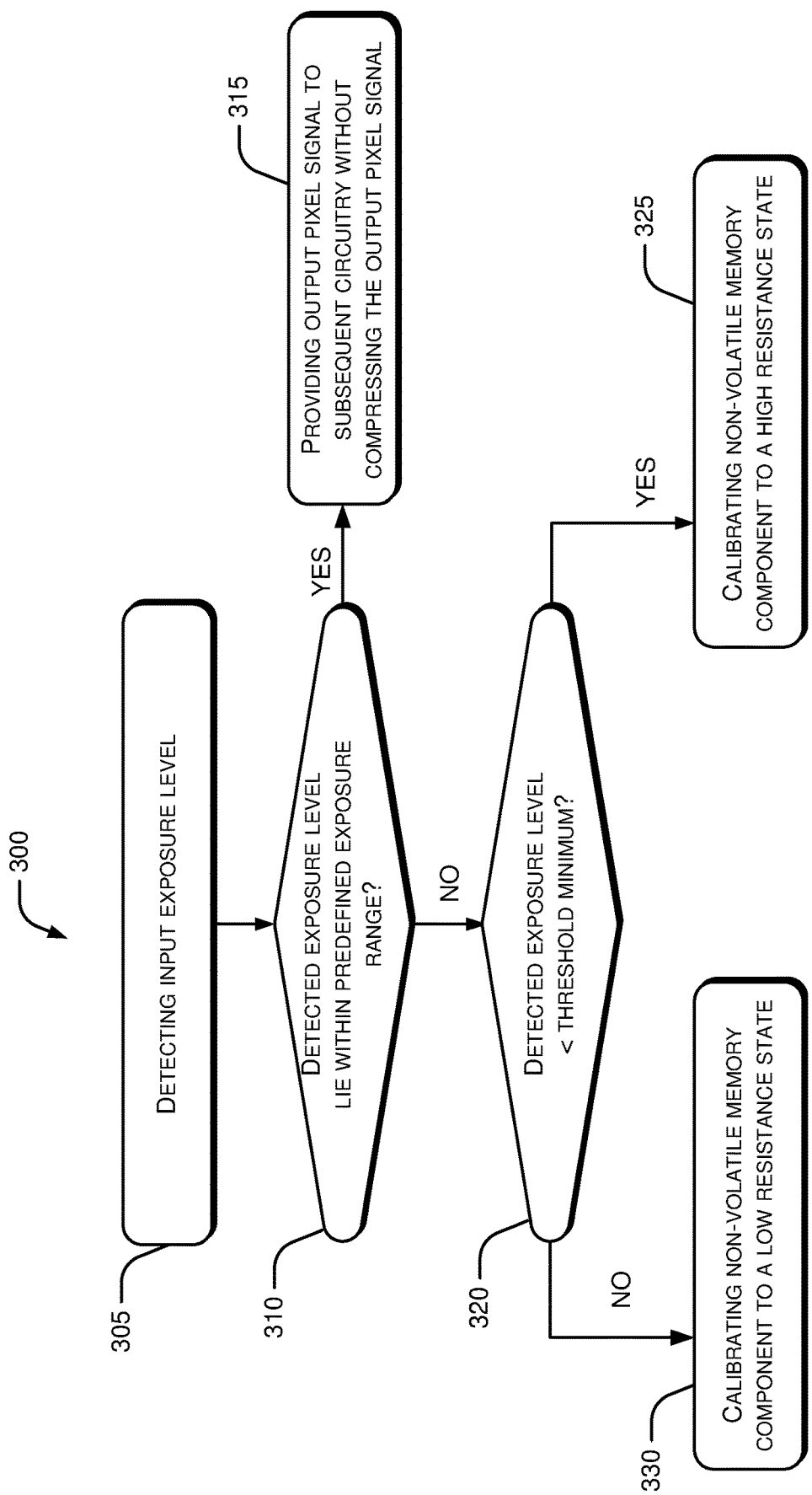
FIG. 3 illustrates an example method for processing an image using the image sensor, in accordance with an embodiment of the present subject matter.

FIG. 3 illustrates a process 300 for calibrating resistance state of a NVM component of an image sensor, according to an example of the present subject matter. The order in which the method 300 is described is not intended to be construed as a limitation, and any number of the described method blocks can be combined in any appropriate order to execute the method 300 or an alternative method. Additionally, individual blocks may be deleted from the method 300 without departing from the spirit and scope of the subject matter described herein. In an example, the method 300 may be performed by the calibration unit 115 of the image sensor 100.

At block 305, an input light exposure level may be detected, based on intensity of an incident light. The input light exposure level may correspond to ambient light conditions, and thus may aid in determining whether the current conditions correspond to overexposure, underexposure, or optimum exposure. In an example, the calibration unit 115 may determine the input light exposure level, based on inputs received from the light detecting element 140.

At block 310, it may be ascertained whether the input exposure level is within a predefined range. The predefined range may correspond to optimum exposure levels. One end of the predefined range corresponds to a threshold minimum, while other corresponds to a threshold maximum. In an example, the calibration unit may ascertain whether the input exposure level is in the predefined range. In case it is ascertained that the input exposure level is in the predefined range, the process 300 may branch ('Yes' branch) to block 315.

At block 315, an output pixel signal may be provided to subsequently circuitry without compressing the output pixel signal. In other words, no calibration of the resistance state may be performed and the output pixel signal may be directly provided to the readout circuitry. Further, in an example, the NVM component may be disconnected from the hybrid pixel.

However, in case it is ascertained that the input exposure level is not in the predefined range, the method 300 may proceed to (No' branch) block 320.

At block 320, it may be ascertained whether the detected input exposure level is less than the threshold minimum. The detected input exposure level being less than the threshold minimum may indicate a case of underexposure. In case it is ascertained that the detected input exposure level is less than the threshold minimum, the method 300 may branch to (Yes' branch) block 325.

At block 325, the resistance of the NVM component may be calibrated to RESET state or partial RESET state. The voltage/current required to obtain the resistance as in the RESET/partial-RESET state, current-voltage characteristics of the NVM component may be analysed. Further, the value of the resistance of the RESET/partial RESET state may be so chosen that the fall of the output pixel is logarithmic or linear. Thus, when the NVM component may be calibrated to the RESET/partial RESET state, a logarithmically or linearly compressed output pixel signal is obtained. In an example, the resistance may be set by the calibration unit. In other examples, the resistance may also be set manually.

Alternatively, at block 320, it may be ascertained whether the detected input exposure level is greater than a threshold maximum, and the subsequent method may proceed accordingly Referring back to block 320, in case it is determined that detected input exposure is not less than the threshold minimum, it may be inferred that it is a case of overexposure, as at block 310, it is already determined that the input exposure level does not lie in the predefined range. In such a case, the method 300, may proceed to ('No" branch) block 330.

At block 330, the resistance of the NVM component may be calibrated to SET/partial-SET state. As explained at block 325, the resistance is so selected that the output pixel signal is compressed during exposure, thereby providing for enhancing dynamic range. In other examples, the user may also select a manner (linear or logarithmic) of $V_{PD}$ evolution to calibrate the resistance state.

Figure 4A:
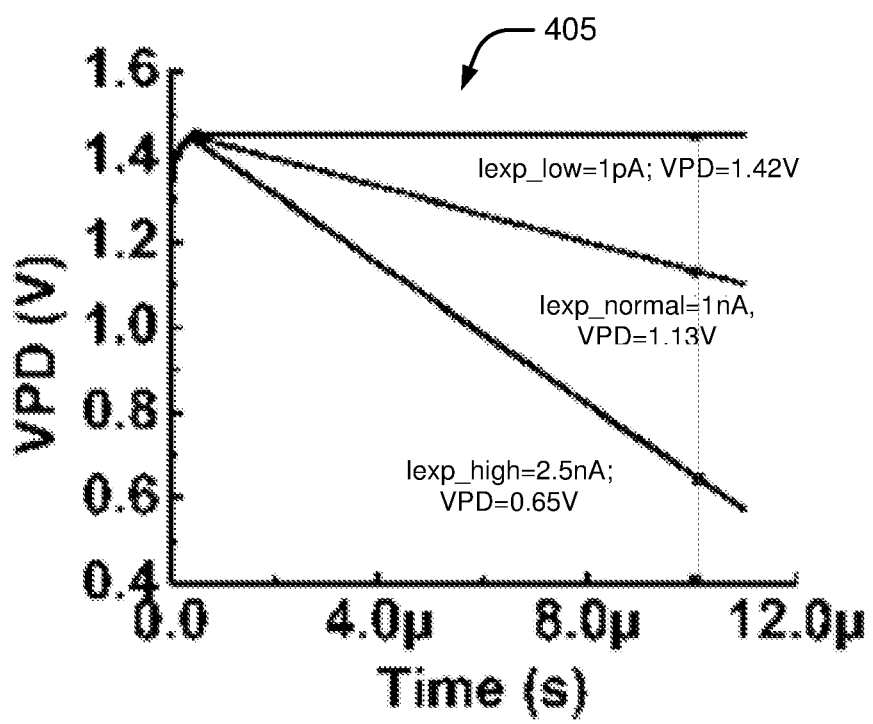
FIG. 4a illustrates output pixel signal evolution without an NVM component.
Figure 4B:
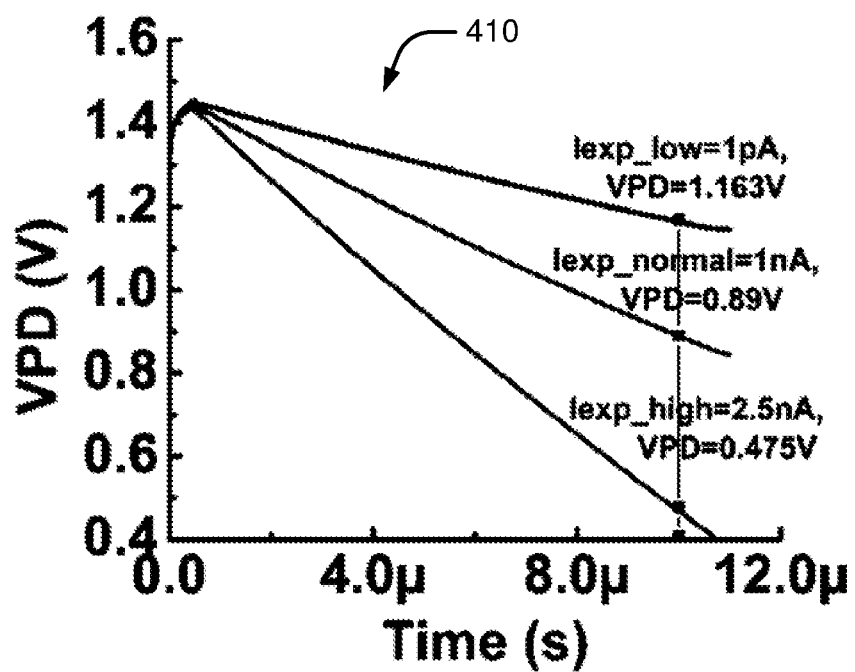
FIG. 4b illustrates output pixel signal evolution with an NVM component, in accordance with an embodiment of the present subject matter.

FIG. 4a illustrates output pixel signal ($V_{PD}$) through a conventional pixel, i.e., without an NVM component; and FIG. 4b illustrates evolution of the output pixel signal ($V_{PD}$) using the OxRAM, according to an example of the present subject matter.

Referring to FIG. 4a, as can be observed from graph 400, the output pixel signal ($V_{PD}$) evolution is only a consequence of the exposure on the photodiode. In the present case, the effect of exposure/lighting is modelled by using an ideal current source ($I_{exp}$) connected to the $V_{PD}$ node. Lower values of $I_{exp}$ correspond to-dim lighting, while higher values correspond to bright lighting. The evolution of $V_{PD}$ signal under three different exposure conditions has been illustrated. As can be seen, the low exposure case is saturated at 1.42 V.

Referring to FIG. 4b, the OxRAM was calibrated to Set state. Application of the output pixel signal ($V_{PD}$) leads to breaking of the CF, thus switching the device to Reset state. $V_{PD}$ evolution through the Reset OxRAM device, is mainly manipulated due to tunneling/hopping mechanisms. This helps slow down the fall of $V_{PD}$, and enables compression of the pixel signal. Further, referring to case (iii), As compared to FIG. 4a, $V_{PD}$ evolution in FIG. 4(b), as can be seen in graph 410, is not saturated for low exposure case. Moreover, for both low- and high-exposure case, the final $V_{PD}$ values lie within a detectable voltage range (~1.32 V to ~0.47 V), thus increasing the dynamic range.

Figure 5:
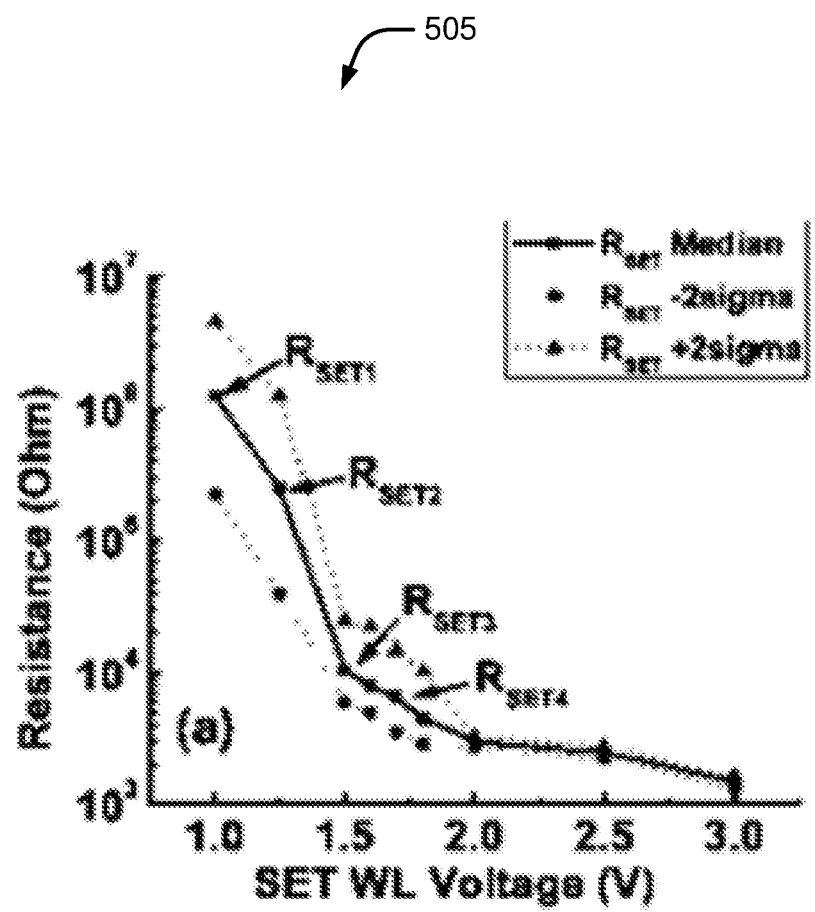
FIG. 5 shows different programmable SET/partial-SET state resistance values for a type of Non-Volatile Memory (NVM) device, in accordance with an embodiment of the present subject matter.

FIG. 5 graphically illustrates various values of a resistance state of a Non-Volatile Memory (NVM) component, OxRAM as an example in this case, and evolution of output pixel signal ($V_{PD}$) with respect to time, for the NVM component going from the SET state to RESET state, in accordance with an embodiment of the present subject matter.

FIG. 5 corresponds to a case, where output pixel signal evolution during and pre-exposure through the OxRAM (NVM component) is studied from the SET state to RESET state. FIG. 5 shows a graph 505 for six different experimentally programmed Set-state resistances ($R_{SET}$) and their dispersion for the 4 Kb OxRAM matrix. For each resistance ($R_{SET}$) in FIG. 5, the NVM component, i.e., OxRAM were first Reset using a fixed Reset condition. $R_{SET}$ programming was achieved by modulating the SET WL voltage. Physically, Set-state resistance control is obtained by controlling the compliance current of the OxRAM device. Compliance current determines the maximum radial dimensions of the formed conductive filament. Thus, by suitable calibration of resistance of the NVM component of the image sensor, the dynamic range of the image sensor may be enhanced.

Figure 6:
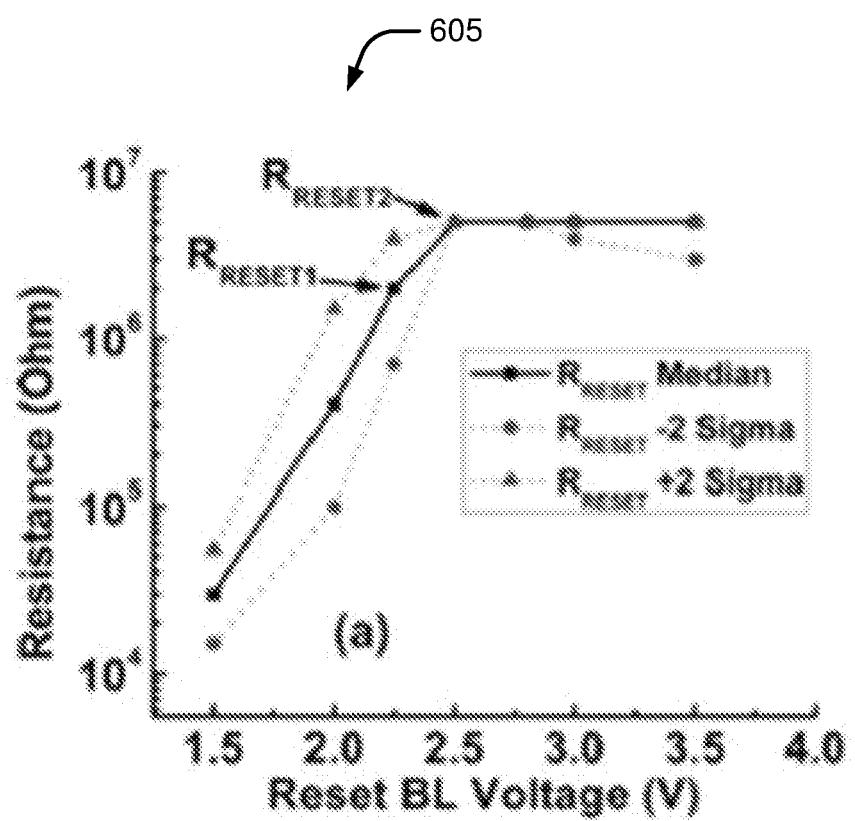
FIG. 6 shows different programmable RESET/partial-RESET state resistance values for a type of Non-Volatile Memory (NVM) device, in accordance with an embodiment of the present subject matter.

FIG. 6 graphically illustrates evolution of output pixel signal ($V_{PD}$) with respect to time, when OxRAM (NVM component) transits from partial-RESET state (soft RESET state) to RESET state (hard RESET state), in accordance with an embodiment of the present subject matter.

FIG. 6 shows a graph 605 illustrating six different experimentally programmed Reset-state resistances ($R_{RESET}$) and their dispersion for the 4 Kb OxRAM matrix. A strong Set pulse was applied before application of each Reset condition. In FIG. 6, $R_{RESET}$ values for VBL above 2.5 V saturates to 5 MΩ, due to limitation of the measurement setup used for reading. In reality the $R_{RESET}$ values may be much higher, for instance, in GΩ range.

Figures 7A, 7B, 7C:
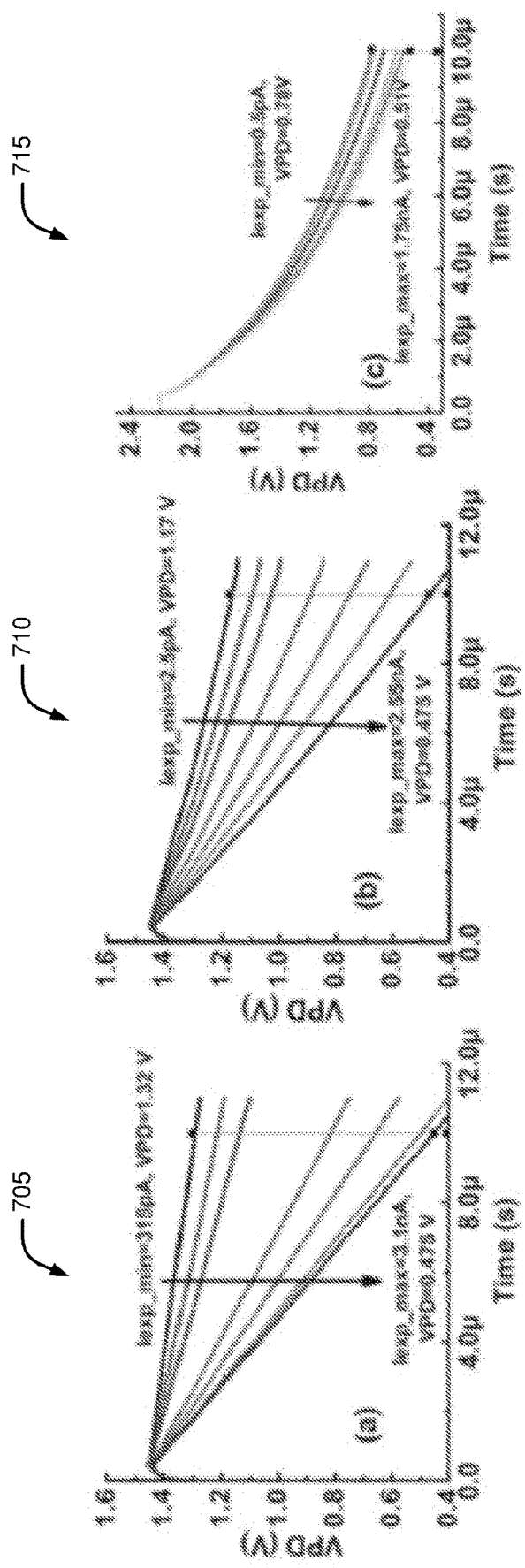
FIG. 7a graphically illustrates output pixel signal ($V_{PD}$) evolution with respect to different light intensity/exposure conditions without an NVM device.
FIGS. 7b and c graphically illustrate output pixel signal ($V_{PD}$) evolution with respect to different light intensity/exposure conditions with an NVM device, in accordance with an embodiment of the present subject matter.

FIG. 7 a graphically illustrates showing output pixel signal ($V_{PD}$) evolution with respect to different light intensity/exposure conditions without an NVM device; FIGS. 7b and c graphically illustrate output pixel signal ($V_{PD}$) evolution with respect to different light intensity/exposure conditions with an NVM device, in accordance with an embodiment of the present subject matter. The simulated exposure for FIG. 7a-c was in the range—0.1 pA to 3.5 nA Referring to FIG. 7a, a graph 705 shows results for the pixel without OxRAM device. Dynamic range of about 20 dB was obtained for this case, with a detectable range of 315 pA to 3.1 nA. The exposure values below 315 pA lead to a final value of $V_{PD}$, which is non-distinguishable. Whereas exposure value above 3.1 nA leads to a $V_{PD}$ in the noise prone range.

Referring to FIG. 7b, a graph 710 shows results for present hybrid pixel, using OxRAM calibrating level of $R_{SET2}$ (from FIG. 5). In FIG. 7b, the OxRAM transition is from SET state to RESET state, and $R_{SET2}$ gave the dynamic range about 60 dB, which is highest among all $R_{SET}$ values shown in FIG. 5. The detectable range in this case was 2.5 pA to 2.5 nA. Further, the exposure values below 2.5 pA were non-distinguishable.

FIG. 7c illustrates a graph 715 showing results using OxRAM calibrating level of $R_{RESET2}$ (from FIG. 6). In FIG. 7c, OxRAM transition is from soft-RESET to hard-RESET, and $R_{RESET2}$ gives dynamic range of about 70 dB. The detectable exposure range in this case was 0.5 pA to 1.75 nA.

Following table 1 compares performance of a hybrid pixel, i.e., pixel having a NVM component (OxRAM) with a conventional pixel without the NVM component (OxRAM).

TABLE 1

| Pixel Implementation | $I_{exp\_min}$ (pA) | $I_{exp\_max}$ (nA) | OxRAM Average power during exposure (nW) $I_{exp}$ = 1 nA | Dynamic range (dB) |
| --- | --- | --- | --- | --- |
| Without OxRAM | 315 | 3.1 | — | ~20 |
| (With OxRAM) $R_{SET1}$ | 100 | 2.7 | 7.9 | ~28.8 |
| $R_{SET2}$ | 2.5 | 2.5 | 3.08 | ~60 |
| $R_{SET3}$ | 100 | 2.3 | 0.56 | ~27.2 |
| $R_{RESET1}$ | 1 | 1.75 | 103.5 | ~64.8 |
| $R_{RESET2}$ | 0.5 | 1.75 | 102.8 | ~70.8 |

All the experimental results for present subject matter have been discussed with respect to OxRAM, it will be appreciated that the same principles extend to other NVM components, such as resistive NVMs and magneto resistive NVMs, as well. Further, from the above results it can be gathered that the present subject matter provides for enhanced dynamic range for image sensors, thereby providing better image quality in case underexposure and overexposure.

Although aspects and features of the present subject matter for case the image sensor have been described in the language specific to structural features, it is to be understood that the present subject matter is not necessarily limited to the specific features described. Rather, the specific features are disclosed and explained in the context of a few aspects of the present subject matter for the image sensor.

We claim:
1. An image sensor comprising an array of hybrid pixels, each pixel comprising:
 a light sensing unit comprising:
  a light detecting element to generate photo-electrons, based on incident light; and
  a charge to voltage conversion unit to provide an output pixel signal based the generated photo-electrons; and
 a non-volatile memory component coupled to the light sensing unit, wherein the non-volatile memory component when calibrated to a resistance state is to compress the output pixel signal during exposure.

2. The image sensor as claimed in claim 1, wherein the NVM is coupled to have an effective voltage drop across two terminals of the non-volatile memory component as the output pixel signal.

3. The image sensor as claimed in claim 1, wherein the image sensor further comprises a calibration unit to calibrate the resistance state of the non-volatile memory component, based on at least one of the incident light, feedback from a readout circuitry, and a predefined manner of compression of the output pixel signal.

4. The image sensor as claimed in claim 1, wherein compression of the output pixel signal during exposure is one of linear compression and logarithmic compression.

5. The image sensor as claimed in claim 1, wherein the non-volatile memory component is calibrated in at least one of a pre-exposure state and an in-exposure state.

6. The image sensor as claimed in claim 1, wherein the non-volatile memory component is at least one of resistive non-volatile memory component and a magneto-resistive non-volatile memory component.

7. The image sensor as claimed in claim 1, wherein the image sensor further comprises a readout circuitry coupled to the array of the hybrid pixels to receive compressed pixel signal from each of the pixels.

8. The image sensor as claimed in claim 1, wherein the image sensor is a CMOS image sensor.

9. A method of processing an image comprising:
 detecting input light exposure level, based on intensity of incident light;
 determining whether the input light exposure level is within a predefined exposure range; and
 when the input light exposure is not within the predefined exposure range, calibrating the resistance of a non-volatile memory component such that an output pixel signal generated based on the incident light is compressed during exposure in a predefined manner.

10. The method as claimed in claim 9, wherein the calibrating comprises:
 calibrating a resistance state of the non-volatile memory to a low resistance state, when the input light exposure is greater than a maximum light exposure; and
 calibrating the resistance state of the non-volatile memory a high resistance state, when the input light exposure is less than a minimum light exposure.

11. The method as claimed in claim 9, wherein the calibrating comprises:
 determining one of a voltage and a current to be applied to the non-volatile memory component, based on current-voltage characteristics of the non-volatile memory component; and
 applying one of the determined voltage and the determined current to the non-volatile memory component to calibrate the resistance of the non-volatile memory component.

12. The method as claimed in claim 9, wherein the output pixel signal is to be compressed in one of a linear manner and a logarithmic manner.

\* \* \* \* \*